April 1, 1958     R. O. OSBORN     2,829,070
TREATMENT OF SYNTHETIC LINEAR POLYESTER
STRUCTURES AND PRODUCT
Filed April 27, 1955
HALOGENATED SURFACE
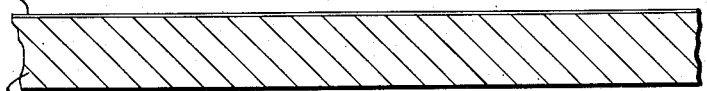
SYNTHETIC LINEAR TEREPHTHALIC POLYESTER STRUCTURE.
INVENTOR
ROBERT OTTO OSBORN
BY
ATTORNEY United States Patent Office 2,829,070
Patented Apr. 1, 1958

2,829,070

TREATMENT OF SYNTHETIC LINEAR POLYESTER STRUCTURES AND PRODUCT

Robert Otto Osborn, Snyder, N. Y., assignor to E. I. du Pont de Nemours and Company, Wilmington, Del., a corporation of Delaware Application April 27, 1955, Serial No. 504,365

13 Claims. (Cl. 117—93)

This invention relates to a process of surface treating linear polyester structures and, more particularly, to a process of halogenating polyethylene terephthalate film to improve the adhesive properties of the film.

Films of polyethylene terephthalate and like linear polyesters which have been biaxially oriented, i. e., stretched in two directions and heat-set, find use in a great variety of applications, e. g., packaging, electrical applications as a dielectric, protective coverings, glass replacement, etc. Heretofore, use of such films, however, has been greatly restricted in applications requiring the heat-sealing or laminating of the film. When it is attempted to heat-seal, or bond together through the agency of heat, an oriented polyethylene terephthalate film, the film shrinks or retracts in the heated area and the heat-seal is usually puckered, may be brittle, and/or opaque, and is liable to tear at the seal as it shrinks. Furthermore, it is necessary to employ, even to effect an unsatisfactory seal between layers of oriented film, temperatures far above normal heat-sealing temperatures employed in sealing unoriented thermoplastic films. For example, whereas unstretched polyethylene terephthalate film is heat-sealable at temperatures from 150°–170° C., it is necessary to employ heat-sealing temperatures within the range of from 235° to 245° C. to seal oriented polyethylene terephthalate film which has been stretched three times (3×) in both directions and heat-set (i. e., subjected to heat of from 150°–200° C. while under tension).

It is an object of the present invention, therefore, to provide oriented linear polyester structures whose surface characteristics have been materially improved as regards adhesion. Another object is to provide biaxially oriented, balanced (having substantially equivalent mechanical properties in both longitudinal and transverse directions) polyethylene terephthalate film the surface of which is readily receptive to practicable heat-sealing and glue-sealing processes. A further object of this invention is to provide a method of modifying a surface of an oriented polyethylene terephthalate film such that its adhesive properties will be materially enhanced. The foregoing and additional objects will become apparent from the description presented hereinafter.

These objects are realized by the present invention which, briefly stated, comprises subjecting the surface of a film of transparent synthetic linear polyester, such as polyethylene terephthalate, to the action of a halogen gas for a length of time sufficient to superficially halogenate, i. e., halogenate the surface of said film, whereby to improve the adhesive characteristics of the film (as illustrated in the acompanying drawing showing a cross-sectional view of the treated film), but insufficient to impair the transparency thereof.

The preferred subject for treatment in accordance with the process of this invention is biaxially oriented, balanced, heat-set polyethylene terephthalate film, and particularly polyethylene terephthalate film which has been drawn to substantially the same extent in both the longitudinal (machine) direction and transverse direction of the film and thereafter heat-set by known expedients. It is to be understood, however, that the present invention comprehends films of any synthetic linear polyester prepared by reacting a glycol selected from the series $HO(CH_2)_nOH$ wherein "$n$" is an integer from 2–10 inclusive, terephthalic acid or low molecular weight alkyl esters thereof, and from 0% up to 20% by weight of a second acid or ester thereof; said second acid being selected from the group consisting of isophthalate acid, dibenzoic acid, hexahydro terephthalic acid, adipic acid, sebacic acid, azelaic acid, naphthalic acid, 2,5,dimethyl terephthalic acid and bis-P-carboxy-phenoxyethane.

The preferred method of halogenation is to subject the film to be treated to an atmosphere consisting of substantially 100% of a halogen gas, i. e., a gas consisting of chlorine, bromine, iodine, or fluorine, or a mixture of two or more halogens. Although the content of halogen gas may be as low as 10–15% and the benefits of the process of the invention still be obtained, the presence of large quantities of inert gases will tend to slow down the reaction. The halogenation reaction may be carried out at temperatures between room temperatures and the degradation temperature of the thermoplastic film. Where gaseous chlorine was used as the sole reactant, the reaction was found to be accelerated by the presence of ultra-violet light. Preferably ultra-violet light having a wave length no greater than 3900 A. U., is employed to catalyze the action of chlorine.

The time required to effect surface halogenation of the film will vary in known manner with the temperature of treatment, the particular halogen employed, the concentration of halogen in the treating atmosphere, the accelerating agent, if any, the thickness of the film, etc. Care should be taken, however, to insure that the treatment is not prolonged to the point where the degree of halogenation visibly impairs the transparency of the film.

The following examples of specific embodiments will serve to further illustrate the principles and practice of the present invention.

EXAMPLE I

Amorphous polyethylene terephthalate (prepared in accordance with the general procedure described in U. S. Patent 2,465,314, issued to Whinfield and Dickson) was extruded at a temperature of 300° C. through a narrow orifice of an extrusion hopper vertically downward onto a cool drum maintained at 65 °C. After quenching, the film was stretched 3× in both directions in accordance with the method for "Stretching of Polyethylene Terephthalate Film" disclosed in copending application of Arthur C. Scarlett, U. S. Serial No. 287,354, filed May 12, 1952, and heat-set while being held under tension at 150° C. The film had a final thickness of 1 ml. After heat-setting, the film was conducted into a chlorine gas for 1 hour at room temperature. The reaction was carried out in the presence of ultra-violet light which served to accelerate the reaction. Analysis of the film showed 0.1% chlorine present in the treated film. The film was then subjected to a series of tests to determine the heat-sealability of the chlorinated film. The seals were made using a precision heat-sealer. The sealing bar of the precision heat-sealer measured ¾" in width and 3¾" in length. The heat-sealing pressure in all cases was 20 lbs./in.². Test samples 1½" wide were cut from the sealed sheets, and the free ends of the sealed strips were pulled apart in a stretching device such as a Suter tester by gripping each end of the sheet in a suitable clamp, one of which is fixed while the other is moved away at a constant speed of 12" per minute. The force in grams required to pull the sheets apart is taken as a measure of the heat-seal bond strength. The following table shows the results of the test, listing the temperature of the heat-sealing bar, time of dwell and force in grams required to break the seal.

Table I

| Seal Temperature | Dwell Time, seconds | Suter Test (gm.) |
|---|---|---|
| 130–150° | 2–6 | No Seal |
| 160° | 6 | 550 |
| 170° | 6 | 150–300 |
| 180° | 2 | 450–600 |
| 180° | 6 | 450–650 |
| 190° | 2 | 600–800 |
| 190° | 6 | 600 |
| 200° | 2 | 800–900 |

EXAMPLE 2

In a manner similar to that described above, amorphous polyethylene terephthalate film was stretched 3× in both directions and heat-set at 150° C. while under tension. The final gauge of the film was 0.25 mil. The film was again subjected to an atmosphere of chlorine for 30 minutes at room temperature under the influence of ultra-violet light. The heat-seal strength of this thin gauge film was found to be 600 grams (Suter) at a seal temperature of 170° C. with a dwell time of 2" and a pressure of 20 lbs. per sq. in.

EXAMPLE 3

Amorphous polyethylene terephthalate film was stretched 3× in both directions, as described in Example 1, and heat-set at 150° C. while under tension. The film was then formed into a cylinder and subjected to an atmosphere of a mixture of chlorine and bromine gases for 10 minutes at room temperature. The chlorine was bubbled through a liquid bromine-sulfuric acid mixture before entering the reaction chamber. Approximately 5–10% bromine (probably in the form of ClBr) was present in the stream of chlorine entering the cylinder. The resulting film was then subjected to a series of tests, as described in Example 1, to determine the heat-sealability of the treated film. 1½" wide strips were cut from the sealed sheet and tested on the Suter tester. The heat-seal strength of this treated film was found to be 435 grams (Suter) at a seal temperature of 180° C. with a dwell time of 6" and a pressure of 20 lbs. per sq. in.

Although in the embodiments of the invention described hereinbefore, the film has been stretched in two directions and heat-set prior to undergoing halogenation, it is to be understood that the film may be subjected to the action of halogen gas at any time after being extruded.

While the method of the present invention is particularly suitable for use in connection with thermoplastic films such as polyethylene terephthalate, it can be applied to fibers, filaments, tubes, rods and the like, of these thermoplastic substances; the surfaces of which are desired to be modified so that they can be satisfactorily subjected to sealing operations. Although particular emphasis, heretofore, has been placed on the preparation of films for heat-sealing operations, it is to be understood that the process of the invention is no less successful in producing films which are readily sealable by other means such as solvent adhesives, cements and glues.

The availability of sealable oriented polyethylene terephthalate films opens many new uses for such films heretofore not useful because of the non-adherability of these type films. Such markets as the prepackaging of meats, frozen food packaging, bags, etc. will now be open to the use of the subject films and the like prepared by the process of the invention.

I claim:

1. A process for treating oriented structures of synthetic linear terephthalic polyesters which comprises subjecting the surface of such structures to the action of a gaseous atmosphere containing a halogen as the reactive constituent, to form a halogenated polyester surface.

2. A process for treating structures of polyethylene terephthalate which comprises subjecting the surface of such structures to the action of a gaseous atmosphere containing a halogen as the reactive constituent, to form a halogenated polyethylene terephthalate surface.

3. The process of claim 2 wherein said structures are films.

4. The process of claim 3 wherein said halogen is chlorine.

5. The process of claim 3 wherein said films are biaxially oriented, balanced, heat-set films.

6. The process of claim 5 wherein said halogen is chlorine.

7. A process for treating biaxially oriented, balanced, heat-set polyethylene terephthalate film which comprises subjecting the surface of said film to the action of gaseous chlorine in the presence of ultra-violet light having a wave length no greater than 3900 A. U., to form a chlorinated polyethylene terephthalate film surface.

8. An oriented synthetic linear terephthalic polyester structure the surface of which is halogenated.

9. An oriented synthetic linear terephthalic polyester structure the surface of which is chlorinated.

10. A polyethylene terephthalate film the surface of which is halogenated.

11. A polyethylene terephthalate film the surface of which is chlorinated.

12. A biaxially oriented, balanced, heat-set polyethylene terephthalate film the surface of which is halogenated.

13. A biaxially oriented, balanced, heat-set polyethylene terephthalate film the surface of which is chlorinated.

References Cited in the file of this patent

UNITED STATES PATENTS

| 2,481,188 | Bagan | Sept. 6, 1949 |
| 2,715,075 | Wolinski | Aug. 9, 1955 |
| 2,718,495 | Dozzi | Sept. 20, 1955 |

FOREIGN PATENTS

| 152,381 | Australia | July 16, 1953 |